US010074913B1

(12) United States Patent
Bussey et al.

(10) Patent No.: US 10,074,913 B1
(45) Date of Patent: Sep. 11, 2018

(54) SELF-PIERCING CONNECTOR

(71) Applicant: GATES CORPORATION, Denver, CO (US)

(72) Inventors: Parker Bussey, Denver, CO (US); Alex Warneke, Denver, CO (US); William Grant, Parker, CO (US); Thomas S. Moss, III, Colorado Springs, CO (US)

(73) Assignee: GATES CORPORATION, Denver, CO (US)

( * ) Notice: Subject to any disclaimer, the term of this patent is extended or adjusted under 35 U.S.C. 154(b) by 0 days.

(21) Appl. No.: 15/813,948

(22) Filed: Nov. 15, 2017

(51) Int. Cl.
*H01R 4/24* (2018.01)
*H01R 4/2412* (2018.01)
(Continued)

(52) U.S. Cl.
CPC .......... *H01R 4/2412* (2013.01); *F16L 33/035* (2013.01); *F16L 59/14* (2013.01);
(Continued)

(58) Field of Classification Search
CPC .... H01R 4/2412; H01R 25/14; H01R 4/2408; H01R 4/2433; H01R 43/01; H01R 4/14; F16L 33/035; F16L 59/14; F16L 33/04
(Continued)

(56) References Cited

U.S. PATENT DOCUMENTS

| 5,041,012 A | 8/1991 | Caprio |
| 5,261,145 A | 11/1993 | Jennings |

(Continued)

FOREIGN PATENT DOCUMENTS

| WO | 20070073286 A1 | 6/2007 |
| WO | 20140152949 A1 | 9/2014 |

OTHER PUBLICATIONS

Crescent Electric Supply Company, Burndy BIPC4/06 4/0-6 AWG Insulated Connector, Manufacturer: Burndy; Catalog No. BIPC4/06; Crescent part No: 44396; UPC: 781810128718; https://www.cesco.com/Burndy-BIPC4-06-Burndy-BIPC4-06-4-0-6-AWG-Insulated-Connector/p1931950, East Dubuque, IL, U.S.
(Continued)

*Primary Examiner* — Jean F Duverne
(74) *Attorney, Agent, or Firm* — Jeffrey A. Thurnau, Esq.; Paul N. Dunlap, Esq.

(57) ABSTRACT

A self-piercing connector comprising, a first body, a second body, the first body comprising a first cutting member for piercing a fluid conduit insulating layer to engage a fluid conduit first conductor, the second body comprising a second cutting member for piercing the fluid conduit insulating layer to engage a fluid conduit second conductor, the first cutting member having a semi-circular form and comprising portions that extend tangentially from each end of the first cutting member, the second cutting member having a semi-circular form and comprising portions that extend tangentially from each end of the second cutting member, the first cutting member and the second cutting member electrically isolated from each other, the first body comprising a first connection member for engaging a cooperating second connection member on the second body, a first body receiver for receiving an electrical conductor connectable to the first cutting member, and a second body receiver for receiving an electrical conductor connectable to the second cutting member.

5 Claims, 4 Drawing Sheets

(51) Int. Cl.
*F16L 33/035* (2006.01)
*F16L 59/14* (2006.01)
*H01R 25/14* (2006.01)
*F16L 33/04* (2006.01)
*H01R 4/14* (2006.01)

(52) U.S. Cl.
CPC .............. *H01R 25/14* (2013.01); *F16L 33/04* (2013.01); *H01R 4/14* (2013.01)

(58) Field of Classification Search
USPC ......................................................... 439/418
See application file for complete search history.

(56) References Cited

U.S. PATENT DOCUMENTS

| | | | | |
|---|---|---|---|---|
| 6,780,044 | B1* | 8/2004 | Sawyer | H01R 4/2433 200/61.62 |
| 8,016,622 | B2* | 9/2011 | Battle | H01R 4/2408 439/279 |
| 8,444,431 | B1 | 5/2013 | La Salvia | |
| 9,287,673 | B2* | 3/2016 | Galla | H01R 43/01 |
| 9,331,401 | B2* | 5/2016 | Pineda | H01R 4/2408 |
| 2003/0059213 | A1 | 3/2003 | Mackie et al. | |
| 2008/0137377 | A1 | 6/2008 | Brengartner et al. | |

OTHER PUBLICATIONS

Crescent Electric Supply Company, 3M 558-BOX Scotchlok™ Insulation Displacement Self Stripping Connector; 22-16 AWG Tap, Red; Manufacturer: 3M; Catalog No. 558-BOX; Crescent part No: 33412; UPC: 054007148616; https://www.cesco.com/3M-558-BOX-3M-558-BOX-Scotchlok-trade-Insulation-Displacement-Self-Stripping-Connector-22-16-AWG-Tap-Red/p1888007; East Dubuque, IL, U.S.

Del City, T-Tap Connectors—16-14 Gauge, https://www.delcity.net/store/TlTap-Connectors/p_9109.h_790081.r_IF1003?mkwid=svSvfwBRE&crid=38094426869&mp_kw=&mp_mt=&gclid=EAlalQobChMl6f38n_GG1wIV2FuGCh0v1gh TEAQYAyABEgJ-bPD_BwE; Menomonee Falls , WI; © Del City, 2017.

Amazon, Install Bay 3MBTT 3M T-Tap Connector 18/14 Gauge—100 Pack (Blue); https://www.amazon.com/Install-Bay-3MBTT-T-Tap-Connector/dp/B001JT72D4; © 1996-2017, Amazon.com, Inc.

European Patent Office; International Search Report and the Written Opinion of the International Searching Authority for application No. PCT/US2018/026183, dated Jun. 12, 2018.

* cited by examiner

SELF-PIERCING CONNECTOR

FIELD OF THE INVENTION

The invention relates to a self-piercing connector, and more particularly to a self-piercing connector comprising a first cutting member having a semi-circular form and comprising portions that extend tangentially from each end of the first cutting member, a second cutting member having a semi-circular form and comprising portions that extend tangentially from each end of the second cutting member, the first cutting member and the second cutting member electrically isolated from each other.

BACKGROUND OF THE INVENTION

Selective Catalytic Reduction (SCR) vehicles are diesel powered motor vehicles which are compatible with the use of an operating fluid to reduce emissions. Typically, the SCR vehicle has a urea tank, separate from the fuel tank, which is used to carry an operating fluid such as an automotive urea solution, or the like. Automotive Urea Solution (AUS) is a solution of high purity urea in de-mineralized water. AUS is stored in a urea tank of an SCR vehicle and is sprayed into the exhaust gases of the vehicle in order to convert oxides of nitrogen into elementary nitrogen and water. An SCR vehicle may then advantageously satisfy various emission standards, such as the Euro V Emissions Standard.

Problematically, AUS freezes at a temperature of approximately minus eleven degrees centigrade. In order to ensure this method of reducing emissions in an SCR vehicle remains effective, the AUS needs to be maintained in a liquid state to allow injection.

SCR vehicles generally rely on a heating wire or the like, which may be molded into or wrapped around the AUS hose or line to avoid freezing of the AUS. This is a rather inefficient and inflexible solution that requires a complete redesign of the fluid line to change its heating properties. Thus, to change the heating characteristics of an internal wire assembly, another production run of the hose must be produced and the resistance per foot is changed when the hose is being extruded by either changing the wire pitch, the wire size or adding more wires into the system, or a combination of all three.

SCR hoses require connection to an electrical power source. Insulation piercing (IP) connectors are commonly used to form mechanical and electrical connections between insulated cables. Typically, an IP connector includes metal piercing blades with sets of teeth on either end thereof. The piercing blades are mounted in housing members (e.g., along with environmental sealing components). The housing members are clamped about the insulated cable so that one set of teeth of a piercing blade engages a main cable and the other set of teeth of the piercing blade can engage another conductor. The teeth penetrate the insulation layers and make contact with the underlying conductors, thereby providing electrical continuity between the conductors through the piercing blade.

Representative of the art is U.S. Pat. No. 8,444,431 which discloses an electrical connector assembly for mechanically and electrically connecting first and second cables each including an elongate electrical conductor covered by an insulation layer includes a housing configured to receive the cables, an electrically conductive bus member in the housing, an electrically conductive first and second blade members in the housing each having an inner end, an outer end and an insulation piercing feature on the outer end. The inner ends are coupled to the bus member and the insulation piercing features each include at least one tooth configured to pierce through the insulation covers of the cables and electrically engage the cable conductor. The bus member provides electrical continuity between the first and second blade members and thereby the conductors of the first and second cables when the conductors are engaged by the insulation piercing feature of the first and second blade members.

What is needed is a self-piercing connector comprising a first cutting member having a semi-circular form and comprising portions that extend tangentially from each end of the first cutting member, a second cutting member having a semi-circular form and comprising portions that extend tangentially from each end of the second cutting member, the first cutting member and the second cutting member electrically isolated from each other. The present invention meets this need.

SUMMARY OF THE INVENTION

The primary aspect of the invention is to provide a self-piercing connector comprising a first cutting member having a semi-circular form and comprising portions that extend tangentially from each end of the first cutting member, a second cutting member having a semi-circular form and comprising portions that extend tangentially from each end of the second cutting member, the first cutting member and the second cutting member electrically isolated from each other.

Other aspects of the invention will be pointed out or made obvious by the following description of the invention and the accompanying drawings.

The invention comprises a self-piercing connector comprising, a first body, a second body, the first body comprising a first cutting member for piercing a fluid conduit insulating layer to engage a fluid conduit first conductor, the second body comprising a second cutting member for piercing the fluid conduit insulating layer to engage a fluid conduit second conductor, the first cutting member having a semi-circular form and comprising portions that extend tangentially from each end of the first cutting member, the second cutting member having a semi-circular form and comprising portions that extend tangentially from each end of the second cutting member, the first cutting member and the second cutting member electrically isolated from each other, the first body comprising a first connection member for engaging a cooperating second connection member on the second body, a first body receiver for receiving an electrical conductor connectable to the first cutting member, and a second body receiver for receiving an electrical conductor connectable to the second cutting member

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
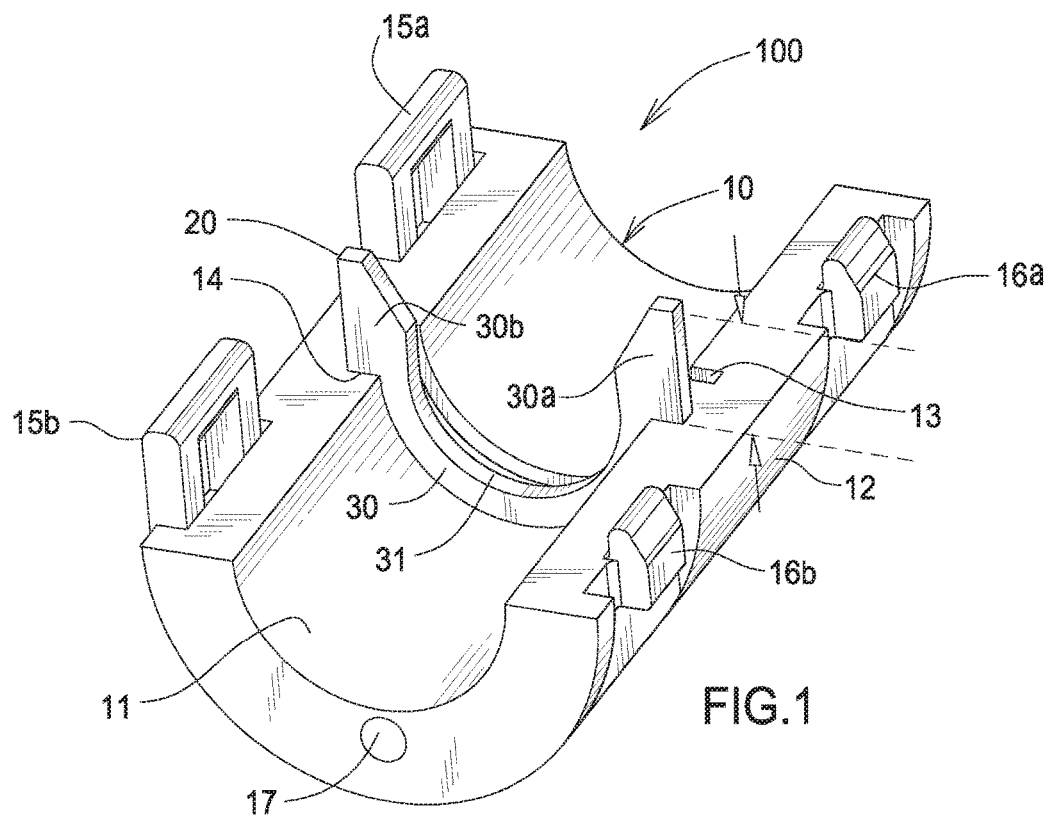
FIG. 1 is a perspective view of a clamp body.

FIG. 1 is a perspective view of a clamp body. Connector 100 comprises two clamp bodies. Clamp body 10 comprises a semi-circular form. Clamp body 10 comprises an inner surface 11 and on outer surface 12. A groove 13 and groove 14 each extend radially and circumferentially from inner surface 11.

Each clamp body 10 comprises a latch 15a, 15b and cooperating hook 26a, 26b on clamp body 20. Closure of a complete connector comprises engagement of a clamp body 10 with a cooperating clamp body 20. A hook 16a of clamp body engages a corresponding latch 25a of a clamp body 20. Clamp body 10 and clamp body 20 are substantially mirror images of each other.

Cutting member 30 is disposed in groove 14. Cutting member 30 has a semi-circular shape and having extended portions 31a, 31b which extend tangentially beyond the body to engage body 20. Cutting member 30 comprises a sharpened edge 31 on the radially inward side of cutting member 30. Sharpened edge 31 cuts or otherwise penetrates an insulating layer when the clamp is applied to a fluid conduit 90.

Cutting member 40 is mounted in a groove 19 in body 20. A corresponding cutting member portion 40a, 40b each engage groove 13 when the connector is closed on a fluid conduit. A corresponding cutting member portion 30a, 30b each engage a cooperating groove in body 20 when the connector is closed on a fluid conduit.

Body 10 comprises a receiver hole 17 through which an electrical conductor can be connected to cutting member 30. Cutting member 30 is conductive.

Fluid conduit 90 can be used to transport water, urea, hydraulic fluid, diesel fuel or any other liquid with which fluid conduit 90 is compatible.

Each body 10, 20 comprise an electrically insulating material such as plastic.

Figure 2:
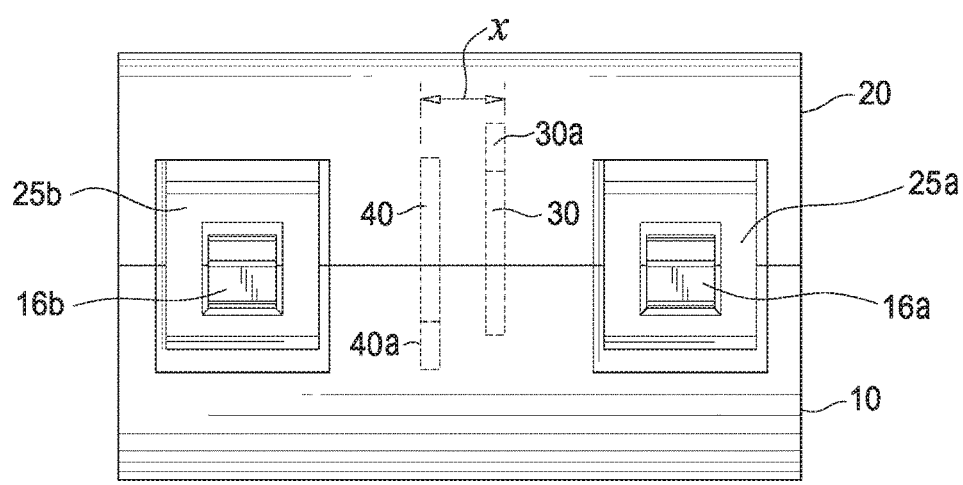
FIG. 2 is a side view of an assembled connector.

FIG. 2 is a side view of an assembled connector. Body 10 is engaged with body 20. Latch 25a is engaged with hook 16a. Latch 25b is engaged with hook 16b.

Cutting member 30 and cutting member 40 have a separation "x" and as such are electrically insulated from each other. Separation "x" prevents cutting member 30 from coming into electrical contact with cutting member 40. Cutting member 30 is in groove 14. Cutting member 40 is in groove 19.

Figure 3:
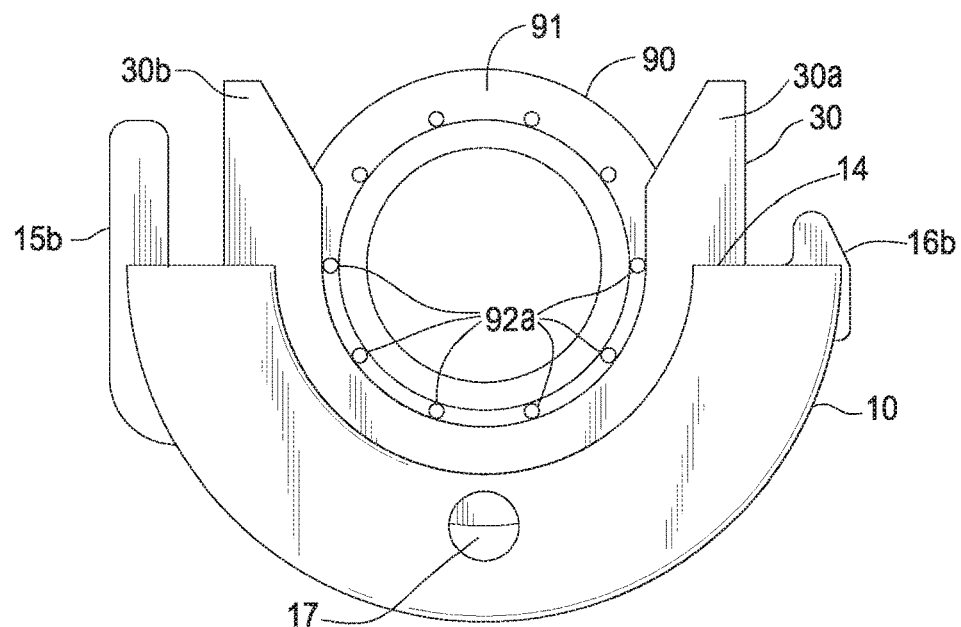
FIG. 3 is an end view of a clamp body.

FIG. 3 is an end view of a clamp body. Fluid conduit 90 is shown in the assembled position within the connector. Cutting member 30 is shown having cut or otherwise penetrated insulating layer 91. Cutting member 30 has a semi-circular shape and extended portions 31a, 31b which extend tangentially beyond the body 10. Disposed within layer 91 are conductors 92a which extend the length of fluid conduit 90. Cutting member 30 penetrates layer 90 sufficient to electrically contact conductors 92a. Cutting member 30 is conductive, therefore once installed cutting member 30 electrically connects all conductors 92a. However, given its semi-circular form cutting member 30 does not contact all conductors 92 in fluid conduit 90, instead only contacting a portion of the conductors, namely, 92a.

Figure 4:
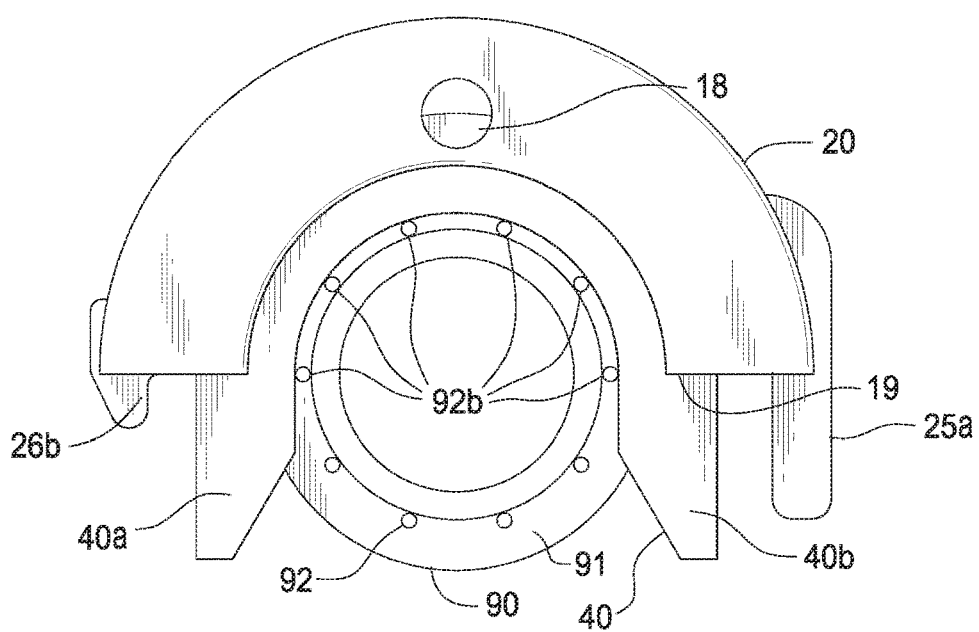
FIG. 4 is an end view of a clamp body.

FIG. 4 is an end view of a clamp body. Fluid conduit 90 is shown in the assembled position within the connector. Cutting member 40 is shown having cut or otherwise penetrated insulating layer 91. Cutting member 40 has a semi-circular shape and having extended portions 41a, 41b which extend tangentially beyond the body 20. Disposed within layer 91 are conductors 92b which extend the length of fluid conduit 90. Cutting member 40 penetrates layer 90 sufficient to electrically contact conductors 92b. Cutting member 40 is conductive, therefore once installed cutting member 40 electrically connects all conductors 92b. Cutting member 40 does not contact all conductors 92 in fluid conduit 90, instead only contacting a portion of the conductors, namely, 92b. Conductors 92a and conductors 92b comprise all conductors 92 in fluid conduit 90.

Body 20 comprises a receiver hole 18 through which an electrical conductor 81 can be connected to cutting member 40.

Figure 5:
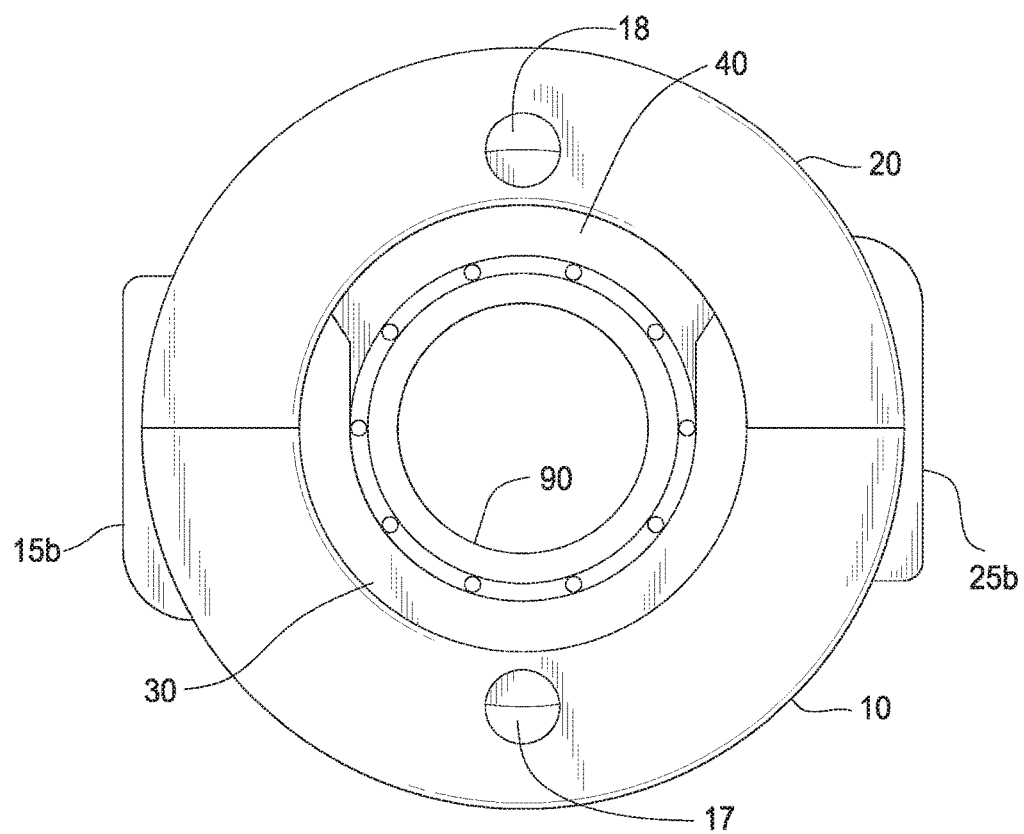
FIG. 5 is an end view of an assembled connector.

FIG. 5 is an end view of an assembled connector.

Body 20 is engaged with body 10 via the latches and hooks described herein. Connector 100 is closed about fluid conduit 90. Cutting member 30 completes a circuit with conductors 92a. Cutting member 40 completes a circuit with conductors 92b. Cutting member 30 and cutting member 40 are not electrically connected to each other. Conductors 92a are electrically insulated from conductors 92b.

Figure 6:
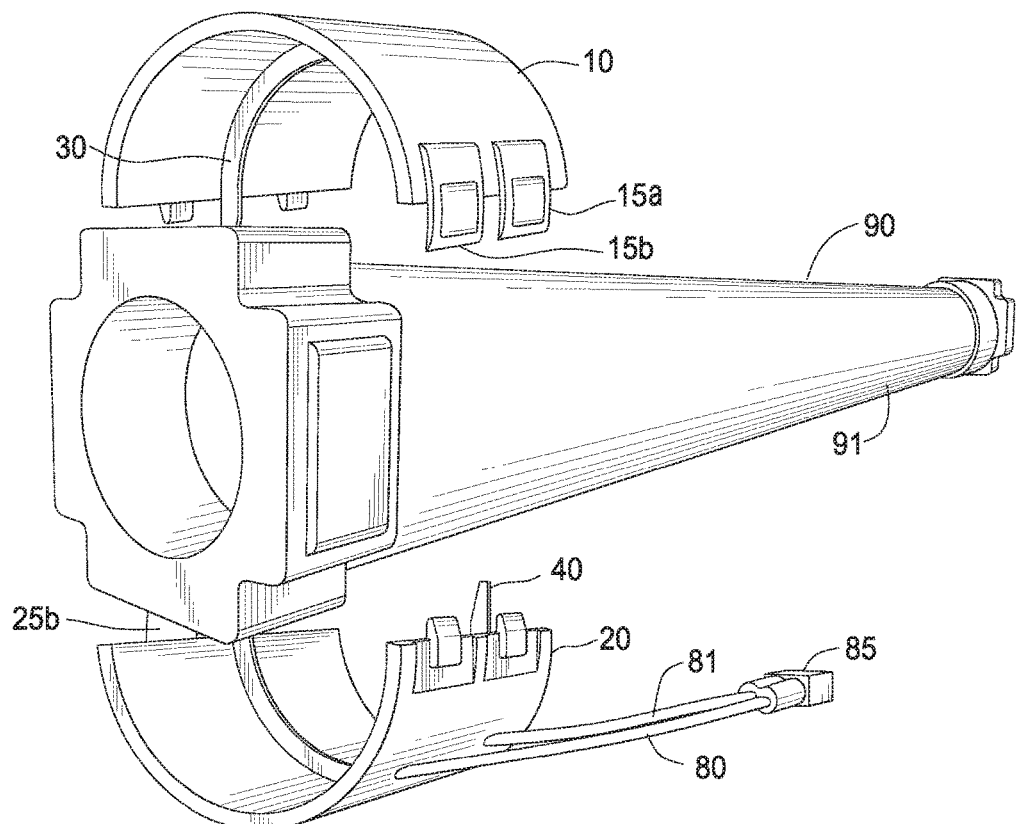
FIG. 6 is a perspective view of the clamp engaging a fluid conduit.

FIG. 6 is a perspective view of the clamp engaging a fluid conduit. To install, body 10 is disposed opposite body 20 on a desired position on fluid conduit 90. Body 10 is then press fit until the latches of body 10 engage the hooks of body 20 and vice versa.

Portions 30a, 30b and 40a, 40b align with the cooperating groove in the respective body 20, 10 to facilitate final assembly of the connector.

Electrical conductors 80 and 81 can then be connected to cutting member 30 and cutting member 40 respectively as may be needed to complete a desired circuit. Connector 85 connects the conductors 80, 81 to an electrical power system to energize conductors 92a and 92b respectively. A single conductor 80 or 81 may be used as well depending on the desired circuit and application. Conductors 92a and 92b comprise resistance heating elements used to raise a temperature in fluid conduit 90 to thereby prevent a fluid from freezing, for example. Electric power can be provided by a vehicle electrical system or other suitable source.

Figure 7:
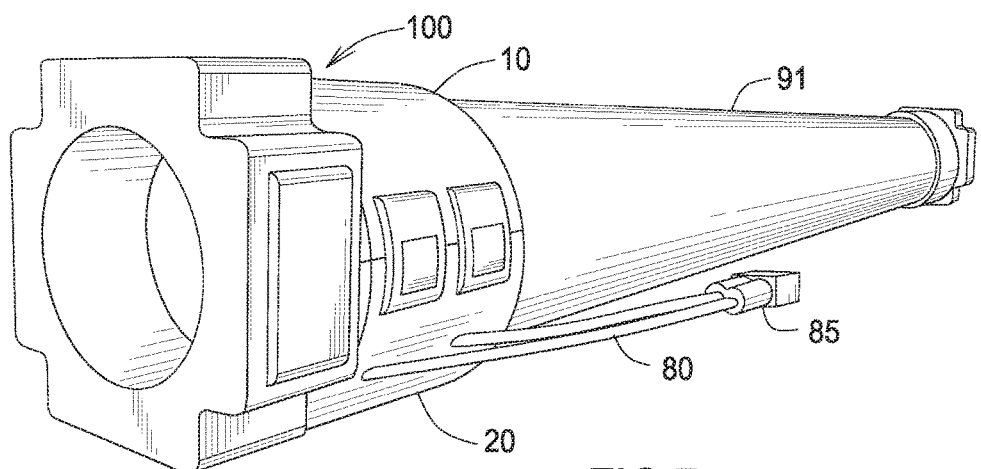
FIG. 7 is a perspective view of the clamp engaging a fluid conduit.

FIG. 7 is a perspective view of the clamp engaging a fluid conduit. Connector 100 is shown fully engaged with fluid conduit 90. Connector 85 can be connected to a power source (not shown).

Although a form of the invention have been described herein, it will be obvious to those skilled in the art that variations may be made in the construction and relation of parts and method without departing from the spirit and scope of the invention described herein.

We claim:

1. A self-piercing connector comprising;

a first body;

a second body;

the first body comprising a first cutting member for piercing a fluid conduit insulating layer to engage a fluid conduit first conductor;

the second body comprising a second cutting member for piercing the fluid conduit insulating layer to engage a fluid conduit second conductor;

the first cutting member having a semi-circular form and comprising portions that extend tangentially from each end of the first cutting member;

the second cutting member having a semi-circular form and comprising portions that extend tangentially from each end of the second cutting member;

the first cutting member and the second cutting member electrically isolated from each other;

the first body comprising a first connection member for engaging a cooperating second connection member on the second body;

a first body receiver for receiving an electrical conductor connectable to the first cutting member; and a second body receiver for receiving an electrical conductor connectable to the second cutting member.

2. The self-piercing connector as in claim 1, wherein the first body and the second body are not electrically conductive.

3. The self-piercing connector as in claim 1, wherein the fluid conduit conveys a liquid.

4. The self-piercing connector as in claim 1, wherein the first connection member comprises a latch.

5. The self-piercing connector as in claim 4, wherein the second connection member comprises a hook.

* * * * *